Dec. 21, 1948.    H. K. KAYE    2,456,948
LIPSTICK CASE
Filed May 16, 1947
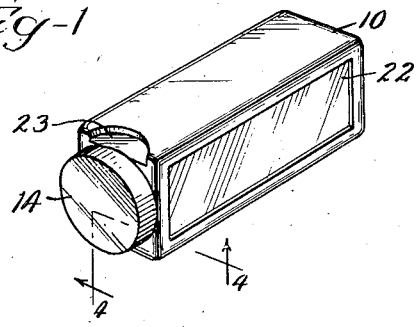
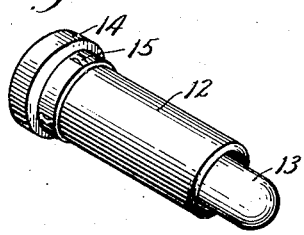 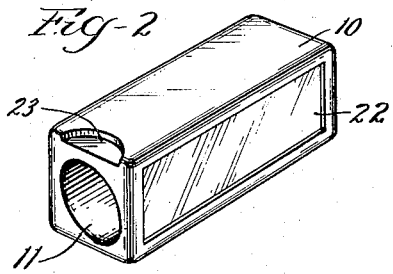
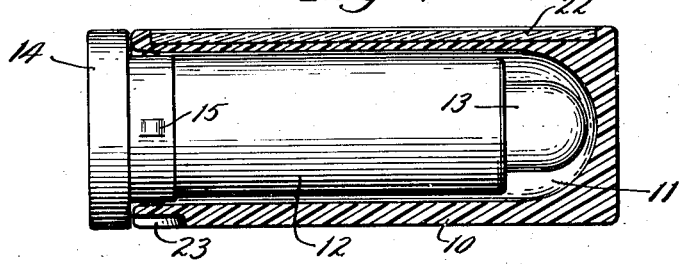
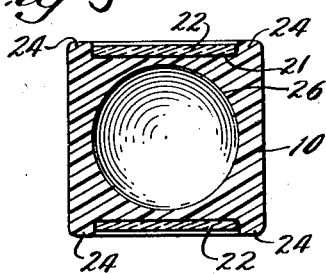
Inventor
Harriette K. Kaye
By:— Louis Robertson
Atty.

Patented Dec. 21, 1948

2,456,948

UNITED STATES PATENT OFFICE 2,456,948

LIPSTICK CASE

Harriette K. Kaye, Chicago, Ill.

Application May 16, 1947, Serial No. 748,543

3 Claims. (Cl. 132—79)

In using a lipstick it is obviously desirable to have a mirror available. Usually the lipstick is carried in a handbag together with a separate mirror. The separate mirror is easily broken and at best means one more item that has to be found among the contents of the handbag. Furthermore, there are times when greater compactness is desired and a separate mirror would be a nuisance.

There have been various proposals heretofore for combining a mirror with a lipstick holder. For the most part they have either involved expensive and perhaps troublesome sliding shields for the mirror to prevent its breakage or the mirror has been quite subject to breakage.

According to the present invention the mirror is combined with a lipstick holder in an exceedingly simple manner and at the same time is surprisingly well protected from breakage. Part of the protection lies in the sturdy construction of the case of the lipstick holder itself which forms a backing for the mirror and prevents excessive flexing thereof. Another feature of the protection is that the case is provided with a rim which projects beyond the mirror so that it is almost impossible to strike a blow against the mirror at the edge of the mirror where a crack is most easily started. Preferably the mirror is cemented substantially throughout its area to the lipstick holder so that in the event the mirror is cracked under some unusual circumstances the parts will not fall out. This protects the owner from being cut by the fragments and also usually maintains the mirror in usable condition.

This application is a continuation in part of an application, Serial No. 633,373, filed by me December 7, 1945 under my maiden name of Harriette Kemp and abandoned May 19, 1947.

Additional objects and advantages of the invention will be apparent from the description and from the drawings in which:

Figure 1 is a perspective view of a mirrored lipstick container chosen for illustration of the invention;

Fig. 2 is a perspective view of the case forming part of Fig. 1;

Fig. 3 is a perspective view of the lipstick holder removed from the case;

Fig. 4 is a longitudinal sectional view through the structure shown in Fig. 1, being taken approximately on the irregular line 4—4 of Fig. 1; and Fig. 5 is a transverse sectional view taken through the case.

Although the law requres a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The embodiment of the invention illustrated in the drawings comprises a case 10 of generally rectangular outlines and having a cylindrical pocket 11 extending inwardly from one end. The pocket 11 is of a size and shape to receive snugly an ordinary lipstick holder 12 carrying the usual lipstick 13 and having a base or handle portion 14. Preferably, the lipstick holder 12 is constructed so that by turning the cylindrical portion thereof with respect to the handle the lipstick 13 will be made to protrude from or retract into the cylindrical portion, this construction already being well known. Except when in use, the lipstick holder 12 is normally held within the case 10 by frictional contact, resilient humps 15 preferably being provided for this purpose.

One or more sides of the case 10 may be provided with a recess 21, in each of which there is positioned a mirror 22. It is preferred that as seen in Fig. 5 two opposite sides of the case 10 be thus provided with mirrors leaving the other two sides free for trade-marks or other indicia. The two sides not provided with a mirror may be provided with notches 23 to facilitate grasping the handle 14.

For greatest attractiveness and also greatest convenience of use, it is preferred that the mirrors be exposed. Exposed mirrors are easily broken, however, especially when they form part of a small object which can easily be dropped and perhaps stepped on. Furthermore, even in a woman's handbag, they may be struck by various objects, either objects within the bag or objects outside of the bag against which the bag impinges. Nevertheless, the construction of the present invention practically eliminates breakage, even though the mirror is a conventional glass mirror.

Probably the two most important features in eliminating breakage are the protection of the edges of the glass and the protection of the glass from undue flexing. Glass can stand pretty severe blows without fracture unless the blows strike the glass adjacent to the edge thereof. This occurrence is preferably prevented, according to the present invention, by having the edge of the glass fit close beside a projecting lip 24. For best results the lip 24 should extend beyond the outer face of the glass as clearly seen in Fig. 5.

Undue flexing of the glass is substantially prevented by setting it substantially all along its length on a firm, rigid, and sturdy base, this being formed by the case 10. Although it will be observed from Fig. 5 that the support for the glass is quite thin near the longitudinal center line of the glass, the structure at this point is part of an arch-type of construction so that it is nevertheless quite rigid. The inner surface of the arch is the surface 26 of the pocket 11.

The case 11 is preferably made of a slightly resilient material such as the common synthetic plastics. Anyone skilled in the plastic art could choose suitable plastics. The slight resiliency of this class of materials helps prevent breakage of the glass by permitting the glass to flex the slight amount necessary to withstand blows from hard objects.

The mirror 22 is preferably secured in the recess 21 by any suitable mirror adhesive. It is preferred that this adhesive bind substantially the entire undersurface of the mirror to the case 10. This has two advantages. In the first place, it compensates for any slight inaccuracies between the flat shape of the back of the mirror and the shape of the bottom of the recess against which it is supposed to rest. In addition, the adhesive and backing transform the mirror into a shatterproof construction so that if the mirror is broken the parts remain in place. This is advantageous from the standpoint of safety, since the parts are not loose to cut the hand which is searching through the handbag. It also tends to hold the mirror together so that it remains useful as a mirror even though cracked. Even if the adhesive is not all along the bottom undersurface of the mirror, it still has these advantages to some extent. It also has an additional advantage of forming a slight cushion between the mirror and the more rigid support therefor formed by the case. The thickness of the adhesive is preferably too slight for the cushioning effect thereof to produce excessive flexing of the glass and consequent breakage thereof.

The preferred form of the invention also provides a patentable design which is especially distinctive because of its extreme simplicity and neatness. The design for the entire lipstick container is seen in Fig. 1 but the design of the mirrored face of the case which appears in Fig. 1 to be exposed to the right is regarded as independently patentable.

The claims for the design are to be deemed included in this application only if they may be included without preventing the application from being accorded a filing date. If necessary in order to accord the application a filing date, it is directed that the design claims be stricken.

From the foregoing it is seen that a lipstick case is provided of extreme simplicity in which a mirror is exposed for utmost convenience and ornamental value but is nevertheless completely protected from the danger of breaking, except under very rare circumstances.

Instead of providing resilient humps 15, the holder and case may have their engaging surfaces so slightly out of round that upon rotating one in the other they wedge together with self-retaining friction.

One material which has been found to be suitable for molding the case 11, and which no doubt typifies others of similar properties, is cellulose acetate. It is believed that any rubber base cement with a solvent which will not attack the mirror coating (such as naphtha) will do.

I claim:

1. A lipstick container comprising a case having a longitudinal pocket of generally cylindrical shape to receive a lipstick holder and having its external cross section shaped to provide side faces, at least one of which is provided with a recess on one face thereof, a mirror fitting snugly within said recess with the lips of the recess extending above the face of the mirror and the case forming a backing for the mirror with the portion of the case between the longitudinal pocket and the recess being solid and arch-shaped in cross-section to provide a sturdy backing for the mirror.

2. A lipstick container comprising a case having a longitudinal pocket of generally cylindrical shape to receive a lipstick holder and having its external cross section shaped to provide side faces, at least one of which is provided with a recess on one face thereof, a mirror fitting snugly within said recess with the lips of the recess extending above the face of the mirror and the case forming a backing for the mirror with the portion of the case between the longitudinal pocket and the recess being solid and arch-shaped in cross-section to provide a sturdy backing for the mirror, and said mirror being cemented to the case.

3. A lipstick container comprising a case having a longitudinal pocket of generally cylindrical shape to receive a lipstick holder and having its external cross section shaped to provide side faces, at least one of which is provided with a recess on one face thereof, a mirror fitting snugly within said recess with the lips of the recess extending above the face of the mirror and the case forming a backing for the mirror with the portion of the case between the longitudinal pocket and the recess being solid and arch-shaped in cross-section to provide a sturdy backing for the mirror, and said mirror being cemented to the case substantially throughout the area of the mirror.

HARRIETTE K. KAYE.

REFERENCES CITED

The following references are of record in the file of this patent:

UNITED STATES PATENTS

| Number | Name | Date |
|---|---|---|
| 2,121,221 | Fontan | June 21, 1938 |
| 2,209,789 | Mureau | July 30, 1940 |

FOREIGN PATENTS

| Number | Country | Date |
|---|---|---|
| 741,685 | France | Dec. 13, 1932 |